United States Patent [19]

Yoshimura

[11] Patent Number: 4,931,814

[45] Date of Patent: Jun. 5, 1990

[54] INK SUPPLY DEVICE FOR INK JET PRINTER

[75] Inventor: Hisashi Yoshimura, Nara, Japan

[73] Assignee: Sharp Kabushiki Kaisha, Osaka, Japan

[21] Appl. No.: 320,930

[22] Filed: Mar. 8, 1989

Related U.S. Application Data

[63] Continuation of Ser. No. 84,588, Aug. 13, 1987, abandoned.

[30] Foreign Application Priority Data

Aug. 13, 1986 [JP] Japan ................................ 61-124350

[51] Int. Cl.[5] .......................... G01D 15/16; B41J 3/04

[52] U.S. Cl. ................................................ 346/140 R

[58] Field of Search ........................................ 346/140

[56] References Cited

U.S. PATENT DOCUMENTS

| | | | |
|---|---|---|---|
| 4,156,244 | 5/1979 | Erikson | 346/140 |
| 4,253,103 | 2/1981 | Heinzl | 346/140 |
| 4,376,283 | 3/1983 | Bower | 346/140 |
| 4,419,678 | 12/1983 | Kasugayama | 346/140 |
| 4,511,906 | 4/1985 | Hara | 346/140 |
| 4,550,324 | 10/1985 | Tamaru | 346/140 X |
| 4,589,000 | 5/1986 | Koto | 346/140 |

OTHER PUBLICATIONS

Greene et al.; Constant-Pressure Head Ink Supply, IBM TDB, vol. 15, No. 9, Feb. 1973, p. 2898.

*Primary Examiner*—Joseph W. Hartary
*Attorney, Agent, or Firm*—Flehr, Hohbach, Test, Albritton & Herbert

[57] ABSTRACT

An ink supply device for an ink jet printer includes a tank for storing ink and transports the ink from the tank to a nozzle at normal pressure by utilizing capillary effect. The tank is provided with an opening which connects the interior of the tank with the outside air but a one-way valve is at the opening such that air can move into but not out of the tank therethrough. A separate device for introducing air into the tank to increase the pressure inside the tank is provided such that air particles accumulating in the passageway between the tank and the nozzle can be removed easily as ink is pushed out of the tank.

5 Claims, 1 Drawing Sheet

INK SUPPLY DEVICE FOR INK JET PRINTER

This is a continuation of application Ser. No. 084,588 filed Aug. 13, 1987, now abandoned.

BACKGROUND OF THE INVENTION

This invention relates to an ink supply device for an ink jet printer for drawing characters and figures on a sheet of paper or the like by causing ink particles to fly and controlling their trajectories.

There have been two types of ink supply devices for such an ink jet printer, one by which a pressure-applying means such as a pump is used to push the ink inside a tank to a nozzle and the other by which ink moves from a tank through a narrow passageway and is supplied to a nozzle at normal pressure by utilizing the capillary effect. When such a supply device is moved around, however, the ink inside the tank is shaken and foams are generated. Such foams are mixed with the ink and they travel together through the passageway to the nozzle. In the case of a printer equipped with a pressure-applying means such as a pump as described above, the foams can be forcibly pushed out of the nozzle. In the case of a printer relying on the capillary effect, however, small air particles grow larger as they accumulate inside the passageway over a long period of time, coming to prevent the flow of ink therethrough. Since the capillary effect is to be relied upon, the passageway for ink through the nozzle is extremely narrow and complicated in shape. If air particles accumulate inside such a passageway, the supply of ink may become insufficient for the purpose of printing.

SUMMARY OF THE INVENTION

It is therefore an object of the present invention in view of the above to provide an ink supply device for an ink jet printer with which ink can be supplied always smoothly.

It is another object of the present invention to provide an ink supply device for an ink jet printer adapted to generate a pressure inside a tank when ink is supplied from a cartridge thereinto such that air particles accumulating inside the passageway can be pushed out by this pressure.

The above and other objects are achieved by an ink supply device of the present invention for an ink jet printer of the type which makes use of the capillary effect to supply the ink brought from a tank through a passageway to a nozzle at normal pressure. Such an ink supply device is provided with an opening in the tank and a one-way valve is provided at this opening. The interior of the tank is in pressure-communicating relationship with the atmosphere outside through this opening and the tank is provided with a pressure applying means for introducing air thereinto.

When a new supply of ink is poured into the tank thus structured, the outlet opening of a container of ink such as a cartridge is connected to the intake opening of the tank and ink is pressed into the tank from such a container. Pressure inside the tank is thereby increased and the one-way valve is closed. This causes the ink inside the tank to be pushed toward the nozzle and the air particles staying in the passageway are also pushed out with the ink.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
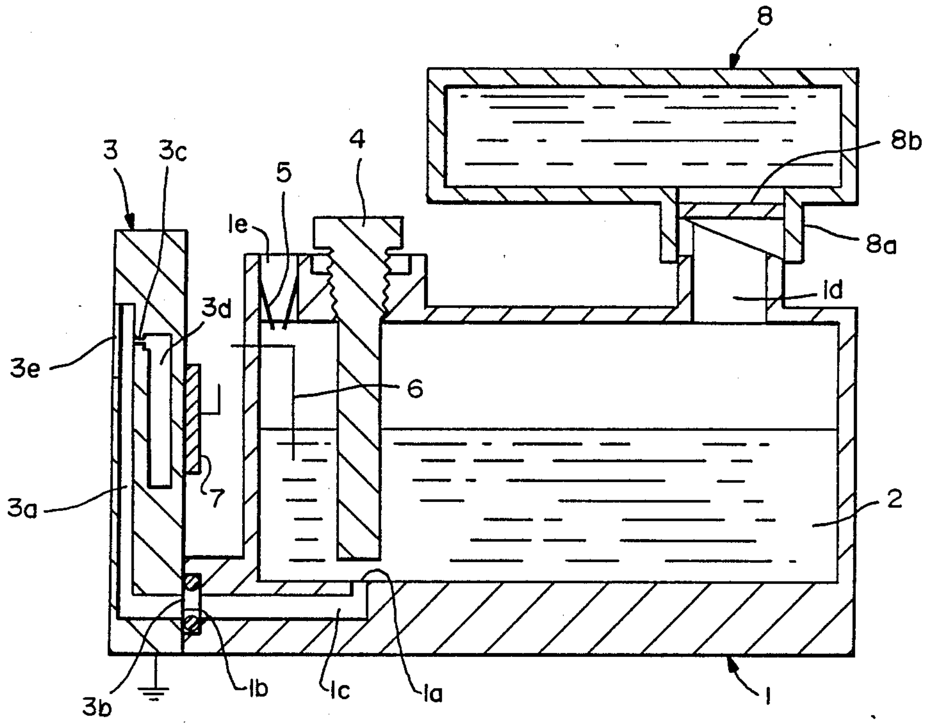
FIG. 1 is a vertical sectional view of an ink supply device for an ink jet printer embodying the present invention immediately before an ink cartridge is attached thereto.
Figure 2:
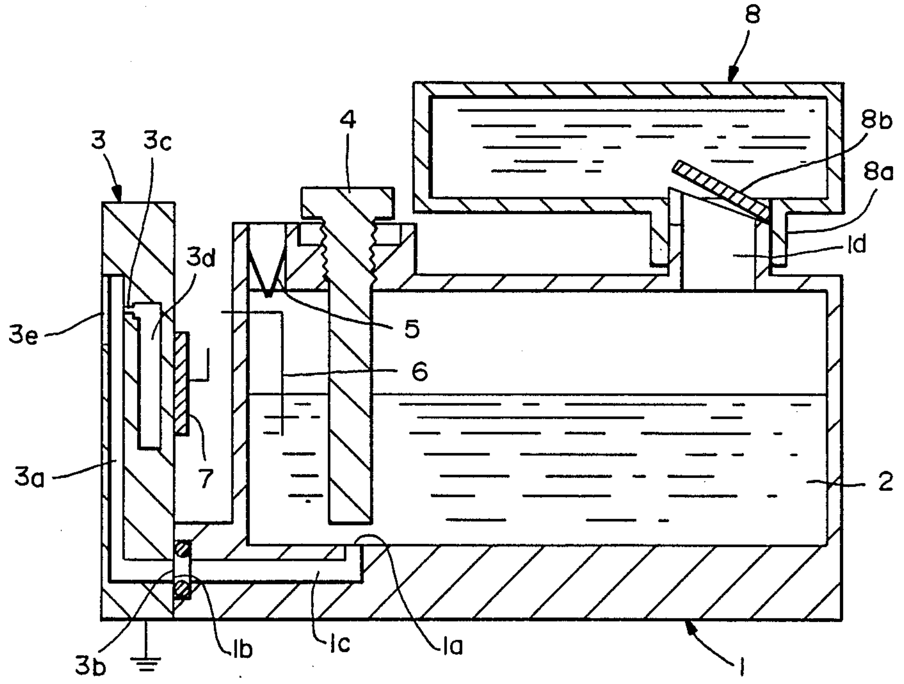
FIG. 2 is a vertical sectional view of the ink supply device of FIG. 1 after the cartridge is attached thereto.

With reference to FIGS. 1 and 2, a tank 1 for storing ink inside is provided with a narrow passageway 1*c* for transporting ink from an opening 1*a* at the bottom to an outlet 1*b* on a side wall. The upper wall of the tank 1 is provided with a cylindrical intake opening member 1*d* having a pointed edge protruding upward and also an air inlet 1*e* with a sloped sectional shape for passing air therethrough into the tank 1. In front (left-hand side in FIGS. 1 and 2), the tank 1 makes a liquid-tight contact with a nozzle 3. The nozzle 3 is provided with a passageway 3*a* connecting an inlet 3*b* with an outlet 3*e*. The nozzle 3 and the tank 1 engage with respect to each other such that the outlet 1*b* of the tank 1 opens into the inlet 3*b* of the nozzle 3 to form a liquid transporting connection. Near the outlet 3*e*, the passageway 3*a* is provided with an orifice 3*c* through which it is connected to a pressure chamber 3*d*.

Numeral 4 indicates a gate screw supported vertically by the upper wall of the tank 1 above the bottom opening 1*a*. When the printer is transported, for example, this gate screw 4 is turned and moved downward such that its lower end covered by a rubber piece (not shown) is pressed against the bottom opening 1*a*, thereby preventing the air inside the tank 1 from entering the passageway 1*c*. Numeral 5 indicates a one-way valve attached at the air inlet 1*e* such that air outside can be introduced into the tank 1 but the air inside cannot escape outward therethrough.

The tank 1 is also provided with a sensor 6 for detecting the surface level of the ink inside the tank 1. Numeral 7 indicates a vibrator attached to the nozzle 3 opposite to the pressure chamber 3*d* such that ink particles can be ejected by applying a high voltage to this vibrator 7 to increase the pressure inside the pressure chamber 3*d*. Numeral 8 indicates an ink cartridge filled with ink to be supplied into the tank 1. The cartridge 8 has an opening 8*a* provided with a cover 8*b* which serves to close it.

During an ordinary printing process, ink 2 inside the tank 1 is transported through the passageways 1*c* and 3*a* and ink particles are ejected outward from the outlet 3*e* of the nozzle 3. As the surface level of the ink 2 moves down inside the tank 1, the corresponding amount of air moves into the tank 1 from outside through the one-way valve 5. When the sensor 6 indicates that the surface level of the ink 2 inside the tank 1 has become sufficiently low, the opening 8*a* of a new cartridge 8 is engaged with the intake opening member 1*d* of the tank 1 as shown in FIG. 1. If the cartridge 8 is pressed downward from the position shown in FIG. 1, the cover 8*b* of the cartridge 8 is pushed open as shown in FIG. 2 by the pointed edge of the member 1*d* around the intake opening and the ink inside the cartridge 8 flows down into the tank 1.

As the cartridge 8 is pushed down from the position shown in FIG. 1 to the position shown in FIG. 2, air does not escape through the space between the opening 8*a* of the cartridge 8 and the intake opening member 1*d* because the part of the cartridge surrounding the opening 8*a* slides down along and guided by the intake opening member 1*d*. Thus, the volume inside the tank 1 is thereby diminished by the amount corresponding to the distance by which the cartridge 8 is pushed down. Pressure inside the tank 1 is correspondingly increased and this causes the one-way valve to close the air inlet 1*e*. At the same time, the ink 2 inside the tank 1 is forcibly pushed by this increased pressure into the passageway 1*c* and further into the passageway 3*a* and is ejected out through the outlet 3*e*. Any air particles which may have been accumulating inside the passageways 1*c* and 3*a* are pushed out at the same time. In other words, these air particles are nearly periodically removed whenever a new cartridge is inserted and hence do not grow as in conventional devices. Moreover, the present invention has the favorable effect of cleaning paper powder and the like from the front surface of the nozzle.

The foregoing description of a preferred embodiment of the present invention has been presented for purposes of illustration and description. It is not intended to be exhaustive or to limit the invention to the precise form disclosed, and many modifications and variations are possible in light of the above teaching. For example, although a cartridge was used in the example described above as the means for applying pressure to send air into the tank 1 but a pressure-applying device of any different type such as a rubber ball may be attached to the tank 1 such that air can be introduced into the tank 1 at any time. Any modifications and variations that may be apparent to a person skilled in the are intended to be included within the scope of this invention.

What is claimed is:

1. In an ink supply device for an ink jet printer for supplying ink from a tank through a passageway to a nozzle at normal pressure by utilizing capillary effect, the improvement wherein said tank is a closed container provided with an air intake opening which connects the interior of said tank with the atmosphere, said device further comprising valve means provided at said opening for allowing air to enter said tank therethrough but preventing air to leave said tank therethrough, and a cartridge which is a sealed container containing air and ink therein and having a tubular ink outlet provided with a cover, said tank being also provided with a tubular ink inlet member, said tubular ink outlet and said tubular ink inlet member being slidably engageable such that said cartridge is removably attachable to said tank and that the action of attaching said cartridge to said tank automatically causes said cover to be removed from said cartridge, raises pressure inside said tank and causes ink and air bubbles in said passageway to be pushed to said nozzle.

2. The device of claim 1 wherein said valve means comprise a one-way valve.

3. The device of claim 1 wherein said ink inlet member is generally cylindrical, protrudes outward from said tank and has a pointed edge.

4. The device of claim 3 wherein said pointed edge is adapted to press said cover and open said ink outlet when said cartridge is attached to said tank and said tubular ink outlet is slidably moved against said ink inlet member.

5. The device of claim 1 wherein attachment of said cartridge to said tank causes air in said cartridge to be introduced into said tank.

* * * * *